Figure 1:
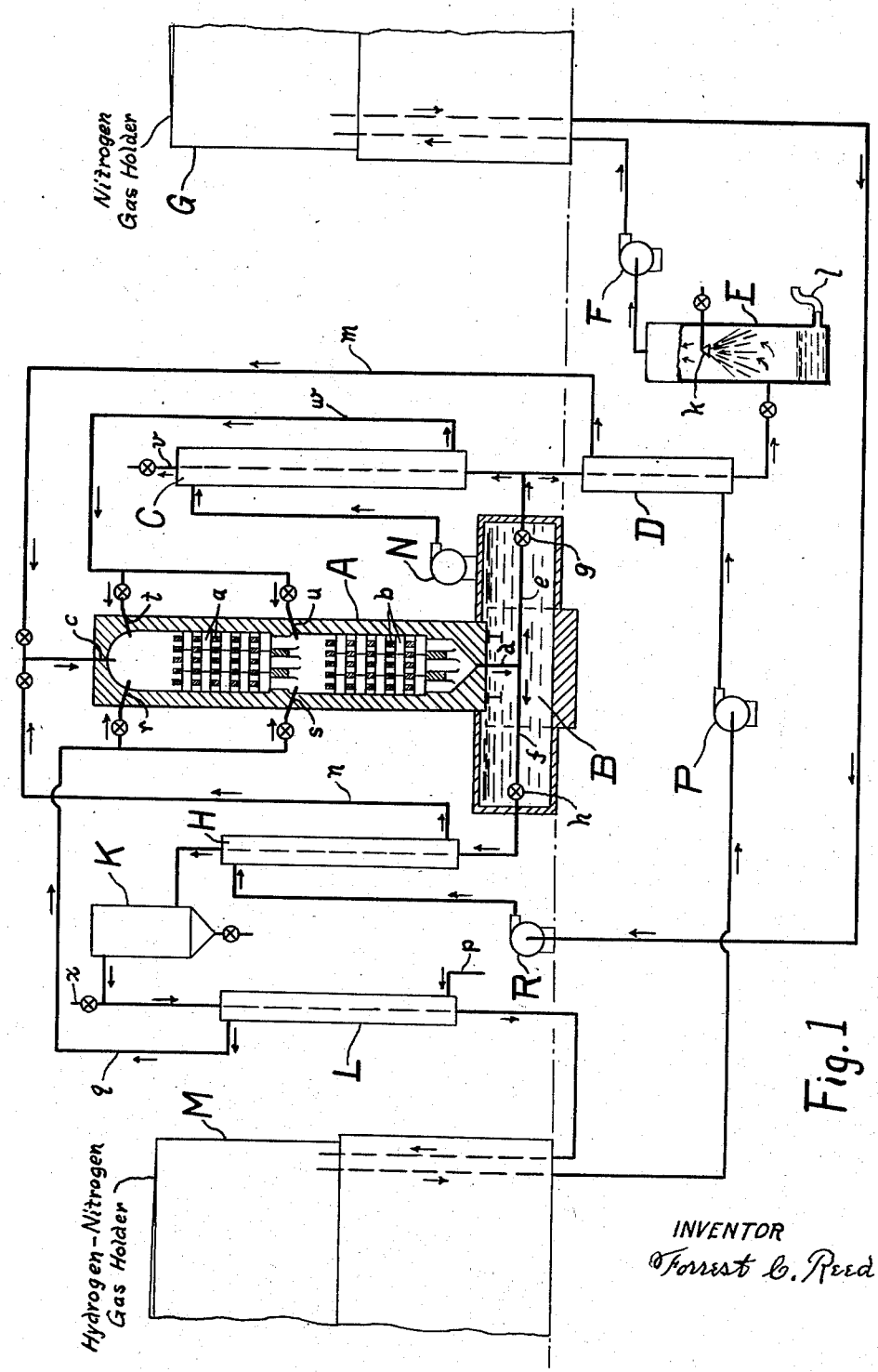

May 10, 1938.  F. C. REED  2,116,848
PROCESS OF PRODUCING CARBON BLACK
Filed July 9, 1934  2 Sheets-Sheet 1

INVENTOR
Forrest C. Reed

May 10, 1938.  F. C. REED  2,116,848
PROCESS OF PRODUCING CARBON BLACK
Filed July 9, 1934   2 Sheets—Sheet 2

INVENTOR
Forrest C. Reed.

Patented May 10, 1938

2,116,848

UNITED STATES PATENT OFFICE 2,116,848

PROCESS OF PRODUCING CARBON BLACK

Forrest C. Reed, Kansas City, Mo., assignor to Le Roy J. Snyder, Kansas City, Mo.

Application July 9, 1934, Serial No. 734,437

10 Claims. (Cl. 134—60)

This invention relates to the production of carbon black and more particularly to the production of carbon black of superior quality.

The object of the present invention is to provide a method of utilizing all of the gases resulting from the thermal dissociation of hydrocarbons within closed retorts to improve the quality of the carbon black thus produced, or to both improve the quality of the carbon black and to produce a hydrogen-nitrogen gas mixture suitable for, and part of which can be utilized for, such processes as the synthesis of ammonia, and at the same time increasing the quantity of carbon black recovered from the dissociation of hydrocarbons, and to provide other advantages as may be brought out in the following description and drawings.

It is known that the better grades of carbon black have been produced by the well known incomplete combustion processes where a very small quantity of carbon was produced in a very large volume of gas and where quality was of more importance than quantity. Even tho such processes produce a high quality of carbon, they are very inefficient and waste great quantities of natural resources such as natural gas. Various attempts have been made to improve such processes as, e. g., by recycling part of the gases of combustion and by introducing hydrocarbons into hot gases of combustion. It is also known that larger quantities of lower grade carbon can be produced by the thermal dissociation processes carried out in closed retorts subjected to alternating periods of heating and dissociation, and sometimes with hot combustion gases or small quantities of air or steam introduced during the dissociation period to improve the quality of carbon. It is further known that the quality of carbon can be improved by carrying out the thermal processes in two stages or steps, the better quality of carbon being usually produced in the second step where the quantity of carbon is less in proportion to the volume of the gases of dissociation, or by recycling the hydrogen from dissociation with the hydrocarbons to be dissociated. Some of the hydrogen resulting from the dissociation of hydrocarbons is burned with air during the heating period, but since the retorts used with the thermal processes had fillings of refractory material or checkerwork of ordinary rectangular units, considerable carbon lodged within the retort during the dissociation period and was burned out for heat during the next heating period, therefore only part of the large volume of hydrogen resulting from dissociation was required for heating and the quantity of excess hydrogen being so great that there has been little if any market for it. The result was that altho the thermal dissociation processes were more efficient than the incomplete combustion processes, yet the waste of hydrogen was considerable and prohibited their use in some localities because of adverse legislation. The burning of carbon for heat represents a considerable loss for carbon is far more valuable as carbon black than for heating purposes when compared to waste hydrogen or even hydrocarbons such as natural gas. This loss will be reduced by the present process as will be described later as well as the losses by former methods of diluting the hydrocarbons during dissociation. Nevertheless, it is obvious from the foregoing processes that the higher quality of carbon is produced where the quantity of carbon is small in proportion to the volume of gases in which the carbon is produced.

I have discovered that the advantages of the former incomplete combustion processes and thermal dissociation processes can be retained and the disadvantages overcome in a single step of a thermal dissociation process by utilizing the hydrogen resulting from dissociation to both increase the quantity and to improve the quality of carbon produced and at the same time producing a hydrogen-nitrogen gas mixture, part of which can be utilized for such processes as the synthesis of ammonia. Briefly, the process of the present invention is carried out in closed retorts subjected to alternating periods of heating and dissociation, the hydrogen resulting from the dissociation of hydrocarbons is burned with air during the heating period, then a portion of the gases of combustion are cooled in order to condense and remove the water resulting from the combustion of hydrogen, the remaining gas, mainly nitrogen, is subjected to high temperatures together with hydrocarbons whereby the carbon resulting from dissociation is produced in an atmosphere of hydrogen and nitrogen. Another procedure is to heat the nitrogen to temperatures above the dissociation temperature of the hydrocarbons then introduce the hydrocarbons and carry out the dissociation at decreasing temperatures. In either case, after the removal of carbon from the gases of dissociation, the hydrogen thus mixed with nitrogen is burned for heat during the next heating period. It is obvious that the quantity of nitrogen thus added to the hydrogen from dissociation can be carried to an extent where all of the hydrogen resulting from dissociation must be used for heating purposes, but since the quality of carbon produced increases with increased quantities of nitrogen present in the gases of dissociation, all of the hydrogen formerly wasted can thus be utilized to improve the quality of carbon.

While the nitrogen present in hydrogen decreases the heating value of the hydrogen, it has the advantage of producing a longer flame more suitable for heating checkerwork. Nitrogen serves the same purpose as increased volumes of hydrogen (as in the former two stage thermal dissociation processes) for improving the quality of carbon produced therein by further separating the individual particles of carbon, but nitrogen has other valuable qualities in that it has lower heat conductivity than hydrogen thereby further preventing agglomeration of carbon particles, and the density of nitrogen is so much greater than that of hydrogen that it has a much greater capacity for carrying carbon. It is possible by the process of the present invention to produce carbon in an atmosphere of as much as two volumes of nitrogen to one volume of hydrogen, and since the carrying capacity of a gas increases greatly with increased density, the hydrogen-nitrogen gas mixture has a very much greater carrying capacity than hydrogen alone, therefore there is less tendency for the carbon to lodge in the apparatus because it will be more readily swept along and carried out with the denser gases, and furthermore, lower velocities with longer time of heat contact and without excessive loss of carbon by deposition is made possible by the process of the present invention.

Apparatus suitable for carrying out the process of the present invention is shown in the accompanying drawings in which like characters of reference indicate similar parts thruout.

Figure 2:
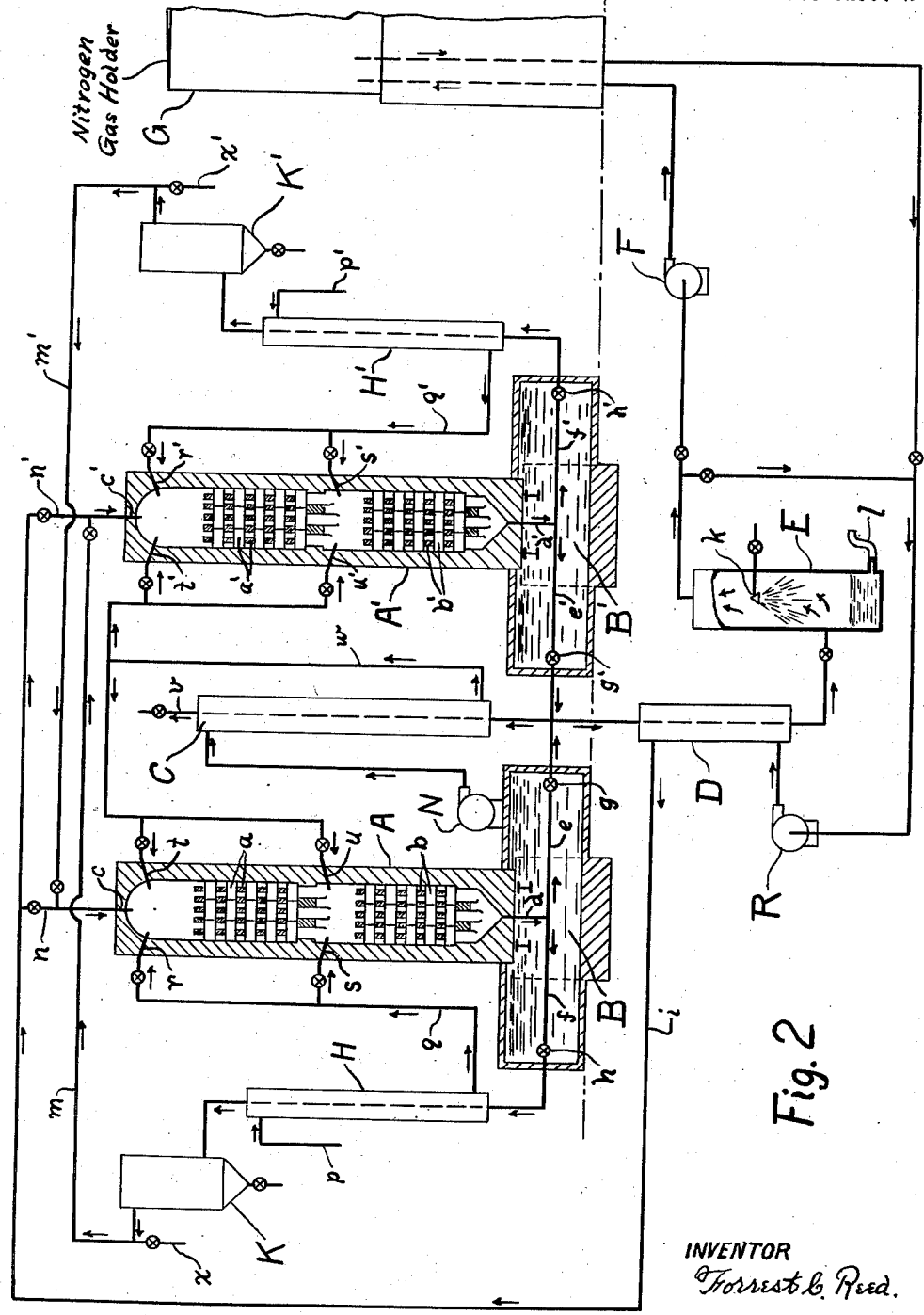

Figure 1 is an elevation, shown diagrammatically and partly in section, of one type of apparatus having one retort, and Figure 2 is an elevation, shown diagrammatically and partly in section, of apparatus having two retorts of the type shown in Figure 1.

Referring now to Figure 1, A is a closed retort capable of operating at high temperatures and suitable for alternating periods of heating and dissociation and having preferably two separate sections or fillings of refractory material and shown here as checkerwork $a$ and $b$, $c$ is an inlet connection for admitting either nitrogen for the dissociation period or hydrogen and nitrogen for the combustion period, $d$ is an outlet or discharge connection communicating with discharge pipes $e$ and $f$ having suitable valves $g$ and $h$, respectively, $r$ and $s$ are nozzles for admitting hydrocarbons, $t$ and $u$ are nozzles for admitting air for combustion, any of these inlet connections may consist of a plurality of pipes or nozzles, or the connections $t$ and $u$ could be in the form of burners with connections for combustible gas and air. The two sections of checkerwork $a$ and $b$ can be of the same size or of different sizes as desired. B is a water tank for partially cooling the gases discharged from retort in order to permit the use of metal heat exchangers and to protect the valves $g$ and $h$ from excessive heat, and furthermore, the deterioration of the quality of carbon is prevented by quickly reducing the temperature of the products of dissociation. C, D, H and L are heat exchangers, E is a cooling apparatus with water spray $k$ and water seal $l$ and suitable for condensing and removing, from the gases of combustion, the water formed by the combustion of hydrogen. K is an apparatus such as an electrical precipitator and suitable for separating the carbon from the gases of dissociation. P, R, N, and F are blowers for circulating the gases of the process. G is a gas holder for nitrogen and M is a gas holder for the hydrogen-nitrogen gas mixture of the process.

The process of the present invention can be carried out with the apparatus of Figure 1 in the following manner. Starting with the heating period, hydrogen for combustion, and diluted with nitrogen and produced during the dissociation period as will be shown later, is drawn from gas holder M by blower P and forced thru heat exchanger D and pipe $m$ and inlet connection $c$ to retort A, while air for combustion is forced by blower N thru heat exchanger C and pipe $w$ to retort thru either nozzle $t$ or thru both nozzle $t$ and nozzle $u$, the temperature of the two sections of checkerwork $a$ and $b$ can be controlled by admitting part of the air for combustion at $u$ when desired. Combustion proceeds over checkerwork sections $a$ and $b$ while the gases of combustion are discharged thru pipe $d$ to pipe $e$ where they are partially cooled by water tank B, a portion of the gases are then passed thru heat exchanger C and thence to the atmosphere thru stack $v$, while another portion is passed thru heat exchanger D preheating the gases for combustion, and thence to condensing apparatus E where the water from the combustion of hydrogen is removed, the remaining gas, mainly nitrogen, is forced by blower F into gas holder G from whence it is drawn for the dissociation period. Heating is thus continued until the checkerwork reaches the temperature desired for dissociation.

When the heating period is completed, the valves are manipulated to change over to the dissociation period. Nitrogen is drawn from gas holder G by blower R and forced thru heat exchanger H and pipe $n$ to retort A thru inlet connection $c$, while hydrocarbons are passed from pipe $p$ thru heat exchanger L and pipe $q$ to retort A thru either nozzle $r$ or nozzle $s$. A very high quality carbon black can be produced by passing the nitrogen admitted at $c$ over the checkerwork $a$, thereby heating it considerably above the dissociation temperature of the hydrocarbons, then admitting hydrocarbons at nozzle $s$ only and permitting the dissociation to proceed at decreasing temperatures over checkerwork $b$, or hydrocarbons can be admitted at $r$ and passed, with nitrogen admitted at $c$, over both sections $a$ and $b$ of checkerwork. In either case, nitrogen dilutes the hydrogen resulting from dissociation thereby forming a gas mixture of much greater density than hydrogen and therefore having a greater carrying capacity for the carbon produced. The carbon produced in this atmosphere of hydrogen and nitrogen is more readily swept along with the denser gas mixture thru the apparatus and has less tendency for lodging or for the agglomeration of the particles because of the increased volume of gas in proportion to the quantity of carbon produced and because of the poorer heat conductivity of nitrogen. The carbon black thus produced is kept in a finely divided state and passes with the gases of dissociation out discharge pipe $d$ and into pipe $f$ where they are partially cooled by water tank B, and thence thru heat exchanger H where they are further cooled before passing to carbon black separator K which operates at temperatures of about from 700° to 900° F. After the removal of carbon black at K, the remaining hydrogen-nitrogen gas mixture is still further cooled thru heat exchanger L and then passed on to gas holder M from whence the gas mixture is drawn for the heating period as previously described, or a portion of the hydrogen-nitrogen mixture may be withdrawn from the process for other purposes such as for the synthesis of ammonia as will be further described later.

Figure 2 shows apparatus consisting of two units each of which are similar to the unit of Figure 1 as indicated by the characters of reference and suitable for carrying out the process of the present invention, similar parts are indicated by like characters of reference with a prime affixed thereto for the duplicated parts. The periods of heating and dissociation in retorts A and A' are alternated so that while one is on the heating period, the other is on the dissociation period. The hydrogen-nitrogen gas holder M and heat exchanger L of Figure 1 are omitted from the apparatus of Figure 2 because the gases from the dissociation period of one retort are utilized directly, while still in a heated condition, for the heating period of the other retort thereby saving considerable heat. Two heat exchangers H and H' and two electrical precipitators K and K' are shown in Figure 2 for simplicity, it is obvious, however, that one heat exchanger and one electrical precipitator would serve for both retorts A and A' as is the case with heat exchangers C and D operating with the gases of combustion from both retorts. The preheating of gases with the apparatus of Figure 2 is somewhat altered from that of Figure 1 as will be seen from the following description where retort A is assumed to be in the heating period and retort A' in the dissociation period. Air for combustion in retort A is forced by blower N thru heat exchanger C and pipe w into the retort thru either nozzle t or thru both nozzles t and u as desired for regulating the temperature of sections a and b of checkerwork. Hydrogen for combustion in retort A is supplied from the dissociation of hydrocarbons in retort A' thru pipe m' and connection c. The gases of combustion are discharged thru pipe d into pipe e where they are partially cooled then part are passed thru heat exchanger C to preheat the air for combustion, then discharged to the atmosphere thru stack v, while the remaining part is passed thru heat exchanger D to preheat nitrogen for the dissociation period in retort A'. From D these gases of combustion are passed to apparatus E and cooled by the water spray k, thus condensing and removing the water formed by the combustion of hydrogen, the remaining nitrogen is either passed to gas holder G by blower F or passed directly back thru heat exchanger D by blower R to the retort operating in the dissociation period. While retort A is thus operating in the heating period, preheated nitrogen is supplied by blower R thru pipes i and n' and inlet connection c' to retort A', and hydrocarbons for the dissociation period are supplied at p' and preheated by heat exchange with the exit gases of dissociation in H' then passed on thru pipe q' to retort A' thru either nozzle r' or s', and for the same reason given in previous description of Figure 1, i. e., a high quality carbon black can be produced by passing the nitrogen admitted at c' over section a' of checkerwork to heat it above the dissociation temperature of hydrocarbons, then admitting hydrocarbons at s' and allowing the dissociation to proceed at decreasing temperatures over section b' of checkerwork, or the hydrocarbons can be admitted at r' and dissociation allowed to proceed over both sections of checkerwork. In either case carbon black is produced in an atmosphere of hydrogen and nitrogen and is of superior quality. The products of dissociation are discharged from retort thru pipe d' into pipe f' where the temperature is lowered in passing thru tank B', they are then passed thru heat exchanger H' as previously described, then thru electrical precipitator K' where the carbon is removed and the remaining gases (mainly hydrogen diluted with nitrogen) are passed on thru pipe m" to retort A thru inlet connection c for heating purposes as previously described. After the heating and dissociation periods are completed as described, they are then reversed in the two retorts. Obviously, the retort operating in the dissociation period must operate at slightly higher pressure than the retort operating in the heating period unless the pressure of the gases of dissociation are boosted by a blower previous to their use in the combustion period, in which case it may be desirable to use a gas holder for the hydrogen-nitrogen gas mixture. When any appreciable amount of carbon is deposited on the checkerwork, it will be desirable to allow the gases of combustion to escape thru stack v for a short interval when the heating period is starting, there will, however, be very little carbon deposited on checkerwork constructed of special checker units as will be pointed out later.

Hydrogen-nitrogen gas for such purposes as the synthesis of ammonia can be withdrawn from the process at any suitable place such as at $x$ and $x'$ of Figure 2, or from $x$ or gas holder M of Figure 1. Since the ratio of hydrogen to nitrogen must be a definite figure for such purposes as the synthesis of ammonia, the quantity of hydrogen used in the dissociation period must be regulated, and since the quantity of nitrogen present with the hydrogen used for combustion determines the quantity of hydrogen required for heating purposes, the quantity of hydrogen-nitrogen gas mixture which can be withdrawn from the process is limited to that in excess of the heating requirements, therefore about one-third of the gas mixture can be withdrawn from the process for the synthesis of ammonia. The maximum volume of nitrogen permissible in the dissociation period is likewise limited to the heating value of the hydrogen-nitrogen gas mixture produced which, of course, must equal the heat requirements of the dissociation period. When all of the hydrogen from the dissociation of hydrocarbons is utilized for heating purposes within the process, nitrogen can be introduced with the hydrocarbons to be dissociated in quantities sufficient to produce about two volumes of nitrogen to one volume of hydrogen in the exit gases of dissociation, depending, of course, on the degree of preheating and the temperature of operation. Another factor which determines the permissible quantity of nitrogen in the dissociation period is the amount of carbon lodging and burned on checkerwork for heat. Obviously, with more carbon burned for heat in addition to the hydrogen from dissociation, more nitrogen can be used in the dissociation period.

The hydrogen-nitrogen gas mixture withdrawn from the process for such purposes as the synthesis of ammonia can be passed, while still heated, over a catalyst such as nickel or cobalt in order to convert any oxides of carbon or unsaturated compounds to methane which is not injurious to catalysts such as are used for the synthesis of ammonia.

A large part of the carbon produced in the closed retorts of thermal processes using the ordinary rectangular type of checker units is deposited on the checkers and burned for heating purposes and while such processes can be greatly improved by the method of the present invention, yet much better results are obtained with checker units such as described in my U. S. Patent 1,980,827, Nov. 13, 1934 for Apparatus for the production of carbon black. With these novel checker units abrupt contacting surfaces are avoided thus preventing the separation of carbon from the gases so that the larger part of the carbon resulting from dissociation is recovered and when such checker units are used with the process of the present invention where carbon is produced in a denser atmosphere of hydrogen and nitrogen having an increased capacity for carrying carbon, practically all of the carbon resulting from dissociation is swept thru the apparatus and recovered as carbon black of superior quality. The advantages of the present invention will be further appreciated when it is considered that the value of carbon, as carbon black, is from ten to fifteen times greater than its value for heating purposes.

The disadvantages of former processes of injecting air, steam or air blast gases with hydrocarbons to be dissociated are overcome by the present process where hydrogen is used for heating and the water from the combustion of hydrogen is removed from the gases of combustion because the diluting gas is substantially all nitrogen and practically free from the oxides of carbon, and even tho some oxides of carbon are occasionally present, they are quickly reduced in quantity by the continued addition of large volumes of nitrogen with the air for combustion. The gases leaving the retort in the dissociation period are then substantially pure hydrogen and nitrogen, part of which can be withdrawn from the process for other purposes as before stated. Not only the great amount of heat which was absorbed in former processes by the reaction of carbon with $CO_2$ and $H_2O$ to form CO is saved, but also the carbon consumed by the reaction is saved, and no carbon is wasted by incomplete combustion. The present invention, however, retains the advantages of former incomplete combustion processes and of thermal processes using diluents because, with the present process, the carbon is produced in an atmosphere where the quantity of carbon is small in proportion to the volume of gases in which it is produced. It is then obvious that while former thermal processes either produced a lower quality of carbon black and utilized otherwise valuable carbon for heating, or consumed valuable carbon in the dissociation of steam and carbon-dioxide of diluents, and often wasted large quantities of hydrogen, the process of the present invention succeeds in utilizing all of the hydrogen produced by the dissociation of hydrocarbons to not only actually increase the quantity and improve the quality of the carbon produced, but also to produce a hydrogen-nitrogen gas mixture suitable for such processes as the synthesis of ammonia.

That an atmosphere of nitrogen has a beneficial effect on the quality of carbon black produced therein is most obvious from a comparison of the quality of carbon produced by former thermal processes with that produced by former channel black and other incomplete combustion processes. This previously well known fact is further disclosed later by Szarvasy (Patent 1,383,674, July 5, 1921). The production of carbon black in atmospheres diluted with combustion gases is disclosed by Lewis (Patent 1,418,811, June 6, 1922) and by Darrah (Patent 1,448,655, March 13, 1923). When diluting hydrocarbons in the ratio of three volumes of combustion gases to one volume of hydrocarbons to be dissociated, this ratio being equal to about three volumes of combustion gases to two volumes of the gases of dissociation and sufficient to produce a high quality carbon, it can be easily shown by calculations that about 50% of all the carbon in the hydrocarbons dissociated is consumed in the formation of CO by the reaction with the $CO_2$ and with only about one-third of the $H_2O$ of the combustion gases, and that over one-third of the heat of combustion is absorbed by this reaction, and that less than one-third of the heat of combustion (the total heat of combustion from the generation of the hot combustion gases used as a diluent) is utilized in a useful manner.

Now the advantages of the process of the present invention over former processes will be obvious when it is considered that in operating the present process with a ratio of three volumes of nitrogen to one volume of hydrocarbons to be dissociated, as in the foregoing example, the loss of sensible heat in reheating nitrogen after condensing and removing water from the combustion gases, even without heat exchange, is no greater than that absorbed in the carbon consuming reaction of processes utilizing hot combustion gases as a diluent in the dissociation of hydrocarbons, and the loss of sensible heat is even less with the heat exchange provided by the present invention and at the same time a large part of the carbon formerly consumed by reaction with $CO_2$ and $H_2O$ to form CO (amounting to 50% or more of the free carbon) is recovered by the process of the present invention.

Even where the hydrogen from dissociation has a value as hydrogen or for its heating value, it can easily be shown that with lean natural gas worth 8 cents/1000 cu. ft., the heat lost by diluting the hydrogen to be used for combustion with nitrogen as in the present process and even without heat exchange, represents less than 1½ cents for each 1000 cu. ft. of gas cracked, therefore if the recovery of carbon is increased even by one-half pound, the present process is profitable because of the increased recovery of carbon as well as because of the greatly improved quality. And when the process is carried out with my novel checker units previously referred to, the recovery of high quality carbon is increased to a point where nearly all of the carbon resulting from dissociation is recovered as carbon black of superior quality and a correspondingly smaller quantity of the hydrocarbons such as natural gas than was used in former processes is required to produce the same quantity and quality of carbon black by the process of the present invention, thereby contributing largely to the conservation of natural resources.

When it is not desired to produce hydrogen-nitrogen mixtures for such purposes as the synthesis of ammonia, the process could be carried out as described and at the same time admitting small volumes of air during and preferably at the end of the dissociation period to prolong dissociation as the temperature decreases, and in order to use larger volumes of diluents, or to withdraw more of the hydrogen-nitrogen mixture from the process, fuel other than hydrogen could be used in part of the heating periods. The partial cooling of the exit gases from retorts could as well be accomplished by vaporizing a liquid injected into the gases instead of by the external cooling means as shown in the drawings, and while the apparatus described herein provides for heating and dissociating in a downward direction, yet the process could as well be carried out in apparatus in which the heating is downward and the dissociating upward or vice versa.

Obviously there are still other ways of carrying out the process of the present invention without departing from the spirit and scope of the present invention, therefore I do not wish to be understood as limiting myself except by the following claims when construed in the light of the prior art.

What I claim is:

1. The process of producing carbon black, which comprises heating nitrogen, within closed retorts in which the periods of heating and dissociation are alternated, to temperatures above the decomposition temperature of hydrocarbons, then introducing hydrocarbons into said nitrogen and carrying out the dissociation of said hydrocarbons at decreasing temperatures to produce carbon, then separating the carbon from the gases of dissociation.

2. The process of producing carbon black, which comprises alternating periods of the combustion of hydrogen with periods of the dissociation of hydrocarbons within closed retorts, condensing and removing from a portion of the gases of combustion, the water formed by the combustion of hydrogen, then reheating the nitrogen remaining after said removal of water, to temperatures above the dissociation temperature of hydrocarbons, then introducing preheated hydrocarbons into said nitrogen whereby the hydrocarbons are dissociated with decreasing temperatures and carbon is produced in an atmosphere of hydrogen and nitrogen, then separating the carbon.

3. The process of producing carbon black, which comprises alternating periods of the combustion of hydrogen with periods of the dissociation of hydrocarbons within a closed retort, condensing and removing from a portion of the gases of combustion the water formed by the combustion of hydrogen, then reheating the nitrogen remaining after said removal of water to temperatures above the dissociation temperature of hydrocarbons, then introducing preheated hydrocarbons into said nitrogen and dissociating said hydrocarbons by continued heating thus producing carbon in an atmosphere of hydrogen and nitrogen, then separating the carbon from the gases of dissociation, while utilizing the gases of combustion and dissociation, after partial cooling by liquid means, for preheating purposes within the process.

4. The process of producing carbon black, which comprises alternating the combustion of hydrogen and the dissociation of hydrocarbons within a closed retort, condensing and removing from a portion of the gases of combustion the water formed by the combustion of hydrogen, then subjecting hydrocarbons together with the nitrogen remaining after said removal of water to the dissociating temperatures of said hydrocarbons whereby carbon is produced in an atmosphere of hydrogen and nitrogen, then separating the carbon from the gases of dissociation.

5. The process of producing carbon black, which comprises alternating periods of the combustion of hydrogen with periods of the dissociation of hydrocarbons within closed retorts, condensing and removing from a portion of the gases of combustion the water formed during the combustion period, then in the dissociation period, subjecting hydrocarbons with the nitrogen remaining after said removal of water to dissociating temperatures whereby carbon is produced in an atmosphere of hydrogen and nitrogen, then separating the carbon and utilizing the hydrogen thus mixed with nitrogen for said combustion period.

6. The process of producing carbon black and a hydrogen-nitrogen gas mixture, which comprises alternating periods of the combustion of hydrogen with periods of the dissociation of hydrocarbons within closed retorts, separating water from the gases of combustion, then, in the dissociation period, subjecting hydrocarbons with the nitrogen remaining after said removal of water from the gases of combustion, to dissociating temperatures whereby carbon is produced in an atmosphere of hydrogen and nitrogen, then separating the carbon and withdrawing from the process a portion of said hydrogen and nitrogen thus produced, while utilizing the remaining portion for said combustion period.

7. The process of producing carbon black and a hydrogen-nitrogen gas mixture, which comprises alternating periods of the combustion of hydrogen with periods of the dissociation of hydrocarbons within a closed retort, separating water from the gases of combustion, then, in the dissociation period, subjecting hydrocarbons with the nitrogen remaining after said removal of water from the gases of combustion, to dissociating temperatures thereby producing carbon in an atmosphere of hydrogen and nitrogen, then separating the carbon and withdrawing from the process a portion of said hydrogen and nitrogen, while utilizing the gases leaving the retort, after partial cooling by liquid means, to preheat the gases entering retort.

8. The process of producing carbon black, which comprises alternating periods of the combustion of hydrogen with periods of the dissociation of hydrocarbons within a closed retort containing heat contacting surfaces of refractory material, condensing and removing water from the gases of combustion and subjecting the nitrogen thus produced and hydrocarbons to high temperatures during said dissociation period thereby producing carbon in an atmosphere of hydrogen and nitrogen, then separating the carbon from the gases of dissociation and utilizing said hydrogen and nitrogen for said combustion period while partially cooling the gases leaving the retort by liquid means then cooling further by heat exchange to preheat the gases going into the retort.

9. The process of producing carbon black, which comprises alternating periods of the combustion of hydrogen with periods of the dissociation of hydrocarbons within a closed retort containing heat contacting surfaces of refractory material, separating water from the gases of combustion and subjecting the remaining nitrogen together with hydrocarbons to high temperatures during said dissociation period whereby carbon is produced in an atmosphere of hydrogen and nitrogen.

10. The process of producing carbon black, which comprises alternating periods of the combustion of hydrogen with periods of the dissociation of hydrocarbons within a closed retort containing heat contacting surfaces of refractory material formed to prevent abrupt contact with the products of dissociation, separating water from the gases of combustion and subjecting the remaining nitrogen together with hydrocarbons to high temperatures during said dissociation period whereby carbon is produced in an atmosphere of hydrogen and nitrogen.

FORREST C. REED.